Feb. 9, 1971 M. E. HALLECK 3,562,710
BIT ERROR DETECTOR FOR DIGITAL COMMUNICATION SYSTEM
Filed April 24, 1968 8 Sheets-Sheet 1

INVENTOR.
MICHAEL E. HALLECK
BY
Campbell, Harris & O'Rourke
ATTORNEYS

INVENTOR.
MICHAEL E. HALLECK
BY
Campbell, Harris & O'Rourke
ATTORNEYS

BIT ERROR DETECTOR FOR DIGITAL COMMUNICATION SYSTEM

Filed April 24, 1968 8 Sheets-Sheet 3

INVENTOR.
MICHAEL E. HALLECK

BY

Campbell, Harris & O'Rourke

ATTORNEYS

INVENTOR.
MICHAEL E. HALLECK
BY
Campbell, Harris + O'Rourke
ATTORNEYS

INVENTOR.
MICHAEL E. HALLECK
BY
Campbell, Harris & O'Rourke
ATTORNEYS

INVENTOR.
MICHAEL E. HALLECK
BY
Campbell, Harris & O'Rourke
ATTORNEYS

INVENTOR.
MICHAEL E. HALLECK
BY
Campbell, Harris & O'Rourke
ATTORNEYS

INVENTOR.
MICHAEL E. HALLECK
BY
Campbell, Harris & O'Rourke
ATTORNEYS 3,562,710

BIT ERROR DETECTOR FOR DIGITAL COMMUNICATION SYSTEM

Michael E. Halleck, Boulder County, Colo., assignor to Ball Brothers Research Corporation, Boulder, Colo., a corporation of Colorado Filed Apr. 24, 1968, Ser. No. 723,737
Int. Cl. G08c *25/00;* H04l *7/00*
U.S. Cl. 340—146.1 21 Claims

ABSTRACT OF THE DISCLOSURE

A bit error detector for use with a digital communication system to quantitatively measure bit errors in received digital information transmitted from a remote location to a receiving station. A digital pattern, transmitted at a predetermined bit rate from the remote location, is received at the receiving station and compared with a reference digital pattern that is related to the transmitted pattern and is synchronized with the received pattern so that inconsistencies between timewise corresponding bits produce indications reflecting system errors.

BACKGROUND—FIELD OF THE INVENTION

This invention relates to apparatus for quality testing of digital signal communication transmission apparatus anr more particularly to apparatus for indicating the inconsistencies between digital information sent and received by a digital communications system from locations remote one to the other.

BACKGROUND—PRIOR ART

It is becoming recognized that digital communication systems possess advantages over analog counterparts in that the information signals produced can be regenerated as often as needed without loss of signal information. In the low order binary mode, digital signal information is transmitted by the presence or absence, or plus and minus variations, of one parameter of the transmitted signal; hence, the receiving equipment need only be capable of making a simple determination either as to the presence or absence of the transmitted signal or to a plus or minus variation. Compared to analog counterparts, lower signal-to-noise ratios in the signal may therefore usually be tolerated without adversely affecting the quality of the transmitted information.

In the transmission of information in digital form, which can be utilized, for example, in the transmission of television signals, wherein the video and audio analog components may be processed and converted into digital form, it is often desirable to monitor the accuracy of the digital signal transmitted and to quantitatively determine the errors introduced by the communication system. Errors indicate imperfections in the communications link which may usually be corrected in order to ensure good picture quality by assuring faithful reproduction of signal information at the receiving unit.

In order to detect the errors in the digital communication system, the received digital signal may be compared at the receiving unit with a replica of the transmitted digital signal information. Heretofore, quantitative bit error measurement of digital information sent and received has proved to be most difficult. At least one cause of the difficulties heretofore experienced has been due to the necessity of generating a compare, or reference, pattern at the receiving unit that is identical, at least in part, to the transmitted pattern, and which is synchronized with the digital signal received by the unit. The prior art has not evolved a suitable error masurement detector meeting such conditions. Further, the problems have proved to be even more acute at high bit frequencies normally required for transmission of television information.

SUMMARY

The present invention is a solution to such problems and accomplishes the quantitative measurement of digital signal discrepanceies between signals sent and received, respectively, in a digital communication system wherein the sending and receiving stations may be remotely located one from the other.

The invention enables timewise corresponding bits of a received digital signal to be compared with a reference signal to determine the number of errors occurring during transmission. The bits are preferably compared at a high bit frequency such as is normally utilized in digital communication systems carrying video or audio television information. In this manner, the actual operating conditions of the communication system may be most nearly simulated during the measurement and detection operation.

Accordingly, it is an object of the invention to provide an apparatus for detection of variations between a digital signal as transmitted and received in a digital communication system.

It is a further object of the invention to provide an apparatus for detection of inconsistencies between a digital signal as transmitted and received in a digital communication system wherein a reference pattern is generated, synchronized with the received digital signal, and then campared with the received digital signal to determine the number of said inconsistencies.

It is accordingly another object of the invention to provide a detector capable of generating a reference pattern, the bit rate and pattern reoccurrence intervals of which are synchronized with the received pattern.

In order to accomplish synchronization, the detector responds to a predetermined sequence in the received pattern to produce a starting signal to lock the reference pattern generator in synchronism with the received pattern. Timewise corresponding bits of the patterns are then compared in ordr to indicate bit discrepances between the patterns.

It is a further object of this invention to provide a word recognition circuit responsive to a predetermined bit sequence in the received signal to provide a control signal utilized to synchronize the patterns.

Since a truly random test pattern sent at one location cannot be meaningfully compared with another and separately generated random pattern at a remote location, the present invention provides pattern generators operative to effect related pseudorandom patterns, that is, related patterns having varying bit sequences in portions thereof, the bit sequences of which vary with respect to each other but which are repeated when the pattern from each generator is repeated.

It is accordingly another object of the invention to provide a pattern generator for producing a predetermined digital pattern of bits having varying digital states.

Another object of this invention is to provide, in the detection apparatus, a comparator for comparison of two digital information input signals to produce a first signal indicative of one predetermined variation possibility in the compared signals, and a second signal indicative of a second predetermined variation possibility in the compared signals.

It is a further object of the invention to provide, in the detection apparatus, a digital signal converter for converting signals of higher order communication modes than the binary mode into binary signals, and to permit comparison of the converted digital signals with a reference digital signal.

Additional objects of the invention will become apparent from the following description which is given primarily for purposes of illustration and not limitation.

DESCRIPTION OF THE INVENTION

Figure 1:
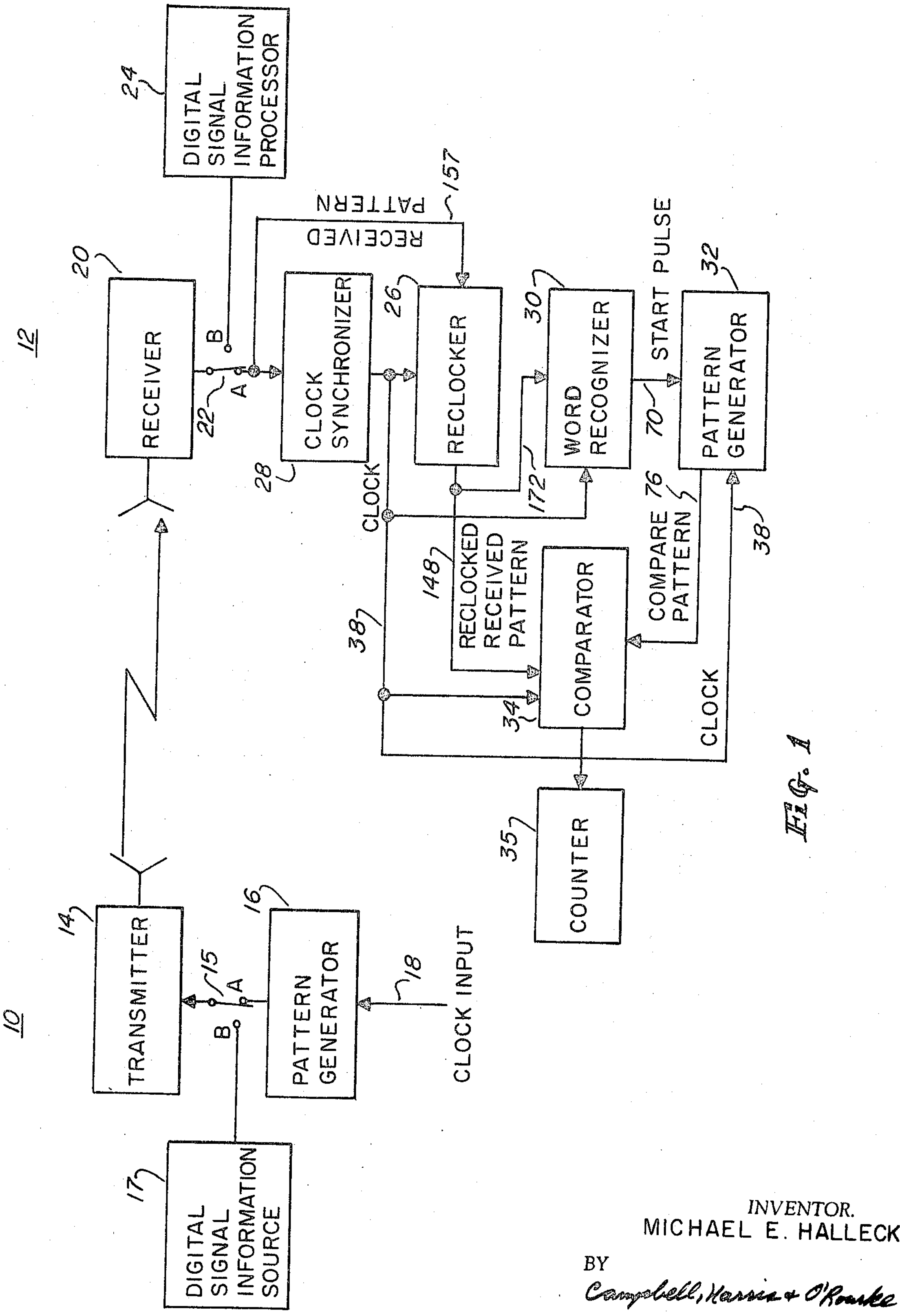
FIG. 1 is a block diagram schematically illustrating the bit error detector of the present invention integrated with a digital communication system.

Referring to FIG. 1, there is shown a sending station 10 and a receiving station 12 wherein the sending station 10 includes a transmitter 14, the radiated carrier signal from which is modulated by a digital signal such as a nonreturn-to-zero (NRZ) signal. The digital system, which may supply the signal to be communicated, includes a digital signal information source 17 of conventional type which may comprise, for instance, a television camera, processing equipment, and an analog-to-digital converter.

Figure 2:
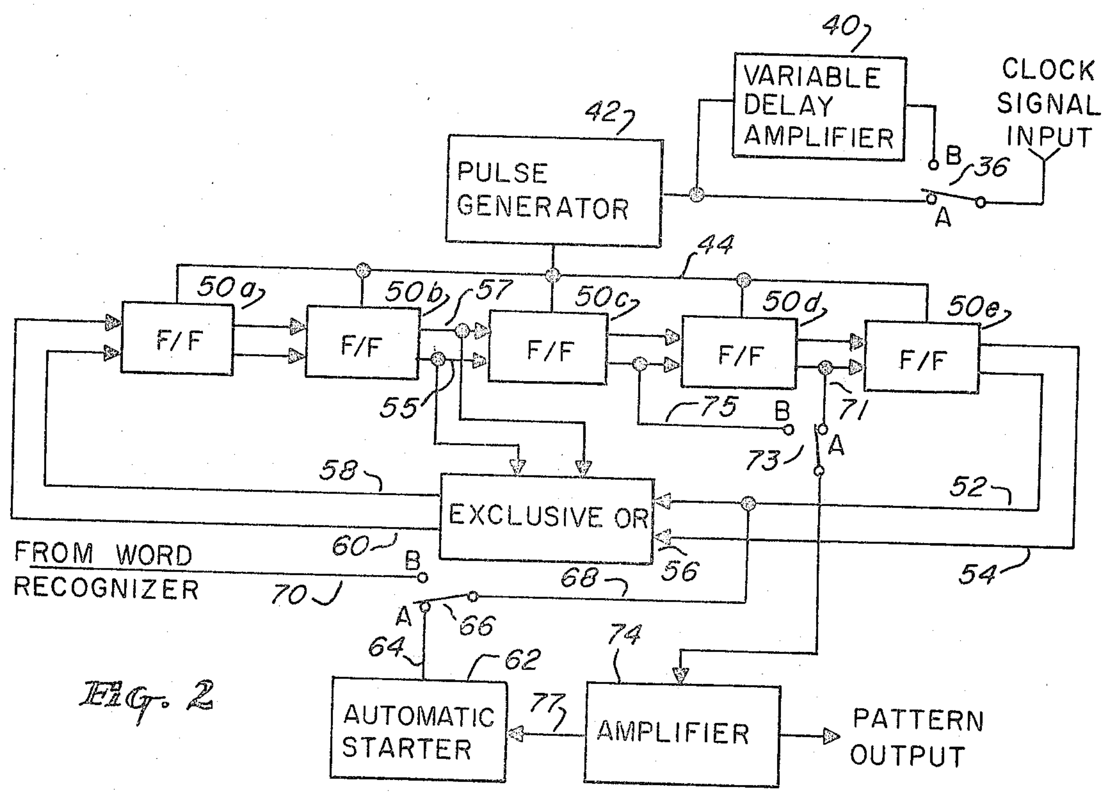
FIG. 2 is a block diagram illustrating the pattern generators of FIG. 1.

A digital pattern generator 16, as shown in FIG. 2, which is capable of generating, for instance, a repetitive thirty-one bit pattern signal, may supply the signal for bit error testing in implementation of the invention. The pattern generator 16 is operative in response to a clock signal at input 18 which signal may normally be in the form of a sine wave. In television broadcasting of digital information, typical clock frequencies and bit transmission rates may be in the order of thirty mHz. A switch 15 may be placed to positions A or B for bit error testing or normal communication, respectively.

A receiver 20 is provided at receiving station 12. The digital signal, after conventional separation from its carrier in the receiver 20, may be conducted to a digital signal information processor 24 also of conventional type and which may include, for instance, a digital-to-analog converter, and a signal display device such as a television monitor. The switch 22 may be placed to positions A or B for bit error testing or normal communication, respectively.

For bit error testing, as in the implementation of the present invention, switch 22 is in position A, and the received signal pattern is improved in quality and retimed in a reclocker 26. As more fully hereinafter explained, a clock signal corresponding in phase and frequency with the received pattern is produced in a clock synchronizer 28. A word recognizer 30 provides a pulse after a predetermined bit sequence in the reclocked received pattern which triggers a pattern generator 32. Pattern generator 32 produces a pattern, bits of which are synchronized and compared in a comparator 34 with timewise corresponding bits of the reclocked and received pattern so as to permit the utilization of an error counter 35 to count the number of times that simultaneous bits of the patterns differ.

The pattern generators 16 and 32 produce pulse trains of the binary mode but it is within the contemplation of the invention that a pattern sent and received may be converted to and from signals of higher order modes, such as more fully explained with reference to FIG. 14. The pattern generators 16 and 32 may be more particularly described with reference to FIGS. 2 through 5. The generators differ slightly one from the other in adaption to use at the transmitting and receiving stations 10 and 12, respectively. For utilization of the apparatus of FIG. 2 as the pattern generator 16 at the transmitting station 10, all switches shown in FIG. 2 are in positions A. For utilization of the apparatus of FIG. 2 as the pattern generator 32 at the receiving station 12, all switches shown in FIG. 2 may be placed to the positions B.

In the utilization of the pattern generator 16, switch 36 being placed in position A, the clock signal input represents the clock signal at input 18; and, in the utilization of the pattern generator at the receiving end 12, namely as pattern generator 32, switch 36 being placed in position B, the clock signal input represents the clock signal on a line 38. In the latter instance, the clock signal is delayed in variable delay amplifier 40 for a conventional purpose more fully hereinafter explained, and which signal is thereafter conducted to a pulse generator 42. In the utilization of the pattern generator of FIG. 2 as pattern generator 16, the clock signal is directly conducted to pulse generator 42 which in either instance converts the sine wave into a series of pulses on line 44 at the clock input signal frequency.

The line 44 is connected to inputs of five binary storage elements or flip-flops 50*a* to 50*e*, which elements together form a shift register such that at the occurrence of each timing pulse from the pulse generator 42 all stored states of flip-flops 50*a* to 50*d* shift to the next succeeding cascaded flip-flop and the state of the flip-flop 50*e* is conducted on lines 52 and 54 to one input of an exclusive OR gate 56. Another input to the exclusive OR gate 56 is connected to two output lines 55 and 57 from flip-flop 50*b*. The state of the flip-flop 50*a* is therefore determined by the output of the exclusive OR gate 56 on lines 58 and 60 which output is a function of the two inputs. The logic of the gate may be expressed in conventional binary code terminology as follows: 1 or 1=0; 0 or 0=0; and 1 or 0=1. In other words, the exclusive OR gate 56 provides an output for two inputs of opposite state, but no output for inputs of the same binary state.

Figure 5:
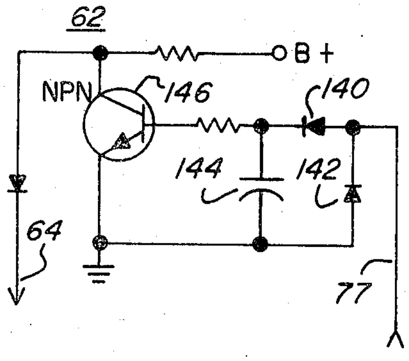
FIG. 5 is a schematic circuit diagram of the automatic starter shown in FIG. 2 used with the sending end pattern generator.

In the utilization of the pattern generator shown in FIG. 2 as pattern generator 16 at the sending station 10 of the system, an automatic starter 62 as hereinafter particularly described with reference to FIG. 5, is provided to maintain the continuous pattern output. The output of the automatic starter 62 is connected to line 64 which leads through a switch 66 when placed in position A to line 68 connected to line 52 between the last binary storage element or flip-flop 50*e* and the exclusive OR gate 56. The automatic starter 62 prevents an all "zero" state in the storage elements 50 by changing the state of flip-flop 50*e*, after which the remainder of the pattern automatically follows.

Figure 10:
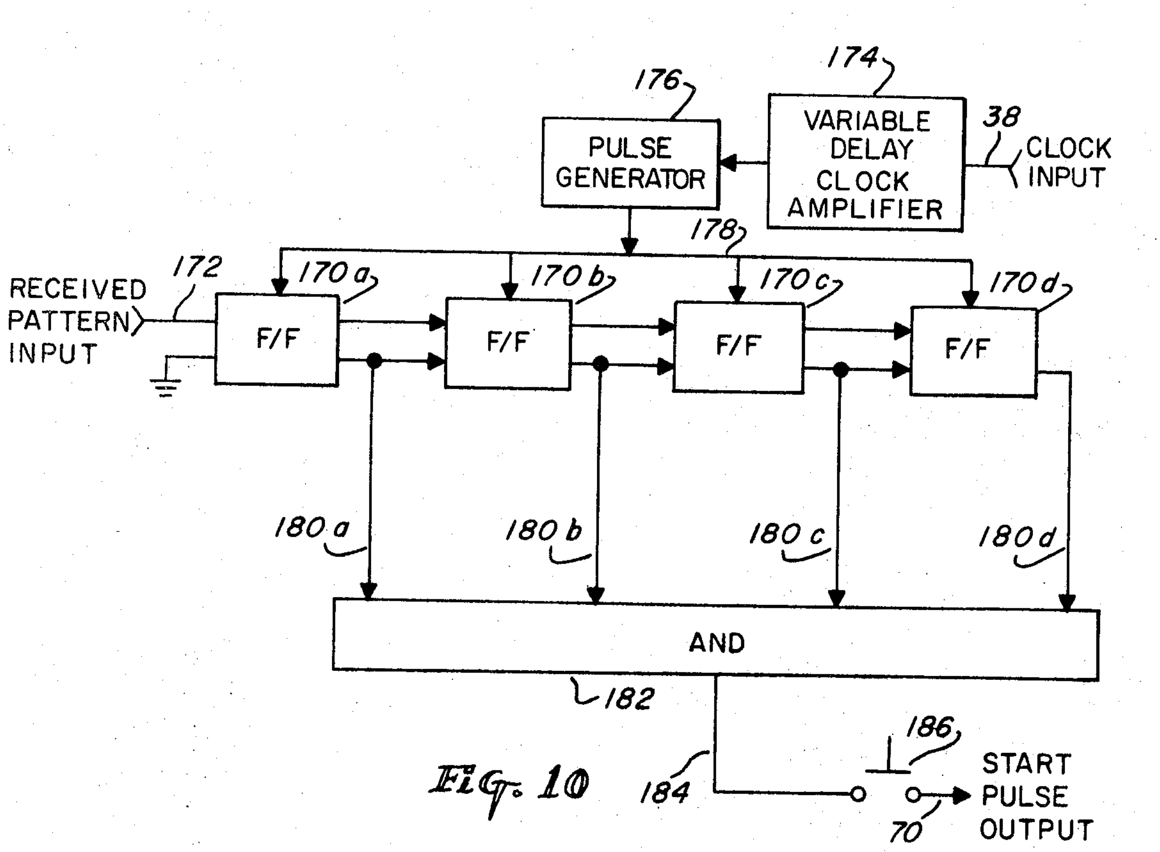
FIG. 10 is a block diagram illustrating the word recognizer of FIG. 1.
Figure 11:
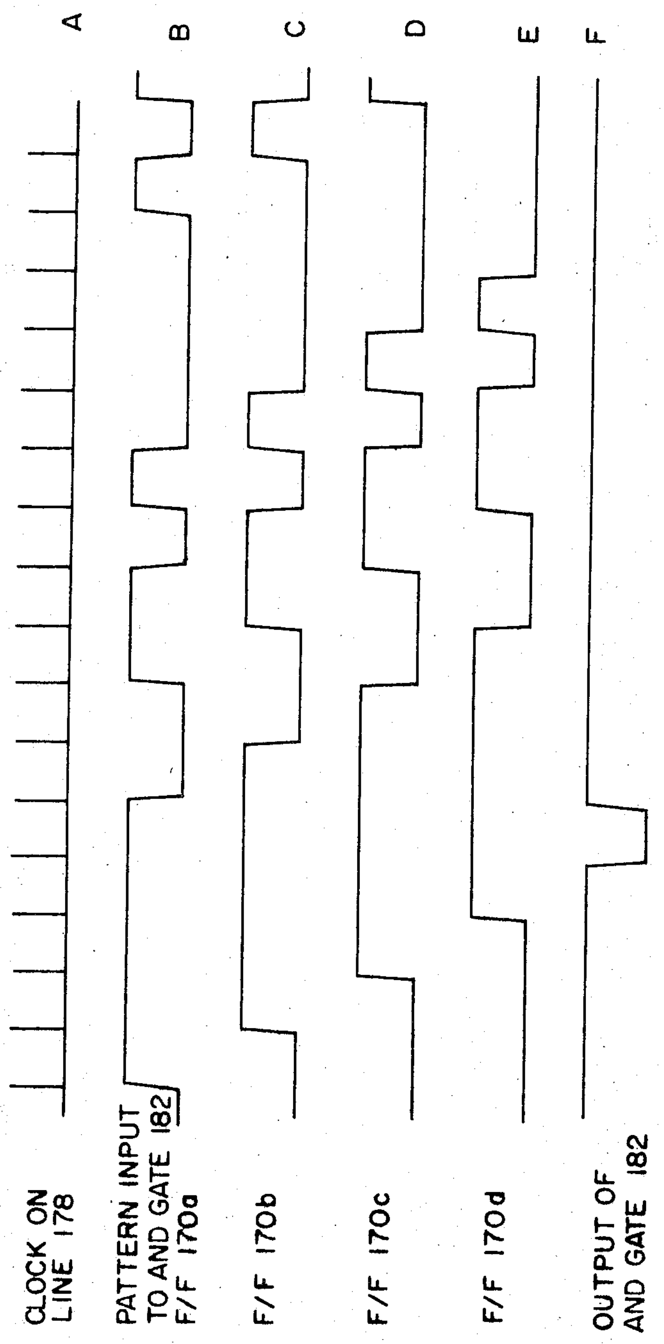
FIG. 11 is a timing diagram illustrating the operation of the word recognizer of FIGS. 1 and 10.

In respect to pattern generator 32, the word recognizer 30 shown and described hereinafter with reference to FIG. 10, provides a signal on line 70 which may be conducted to line 68 when switch 66 is in position B. The pattern generator 32 is rendered operative in response to the signal from word recognizer 30.

Since the overall pattern is produced at the output of each flip-flop 50, although timewise spaced each to the one succeeding by a bit interval, the output in respect to pattern generator 16 is arbitrarily taken between one output line and ground from storage element 50*d* and conducted through a line 71 and a switch 73 in position A to an amplifier 74 producing a pattern output conducted through switch 15 in the position A to transmitter 14 of FIG. 1; and, in respect to pattern generator 32, the output is taken between one output line and ground from storage element 50*c* and conducted through a line 75 and switch 73 in position B, to the amplifier 74 producing a pattern output to comparator 34 on a line 76.

In respect to pattern generator 16, another output line 77 leads from amplifier 74 and is connected to the automatic starter 62.

Figure 3:
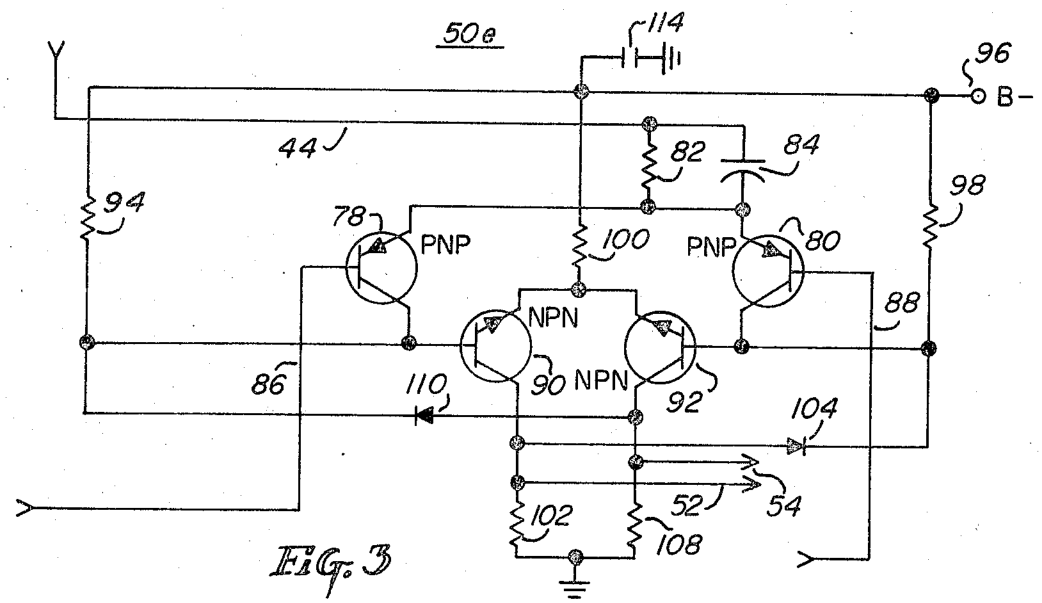
FIG. 3 is a schematic circuit diagram of a storage element of the pattern generator shown in FIG. 2.

Referring to FIG. 3, a circuit diagram of the binary storage element or flip-flop 50*e* is shown wherein the elements and connections shown and described correspond to similar elements and connections in the binary storage elements or flip-flops 50*a* to 50*d*.

Each flip-flop 50, as represented, to avoid repetition by flip-flop 50*e* in FIG. 3, includes a pair of PNP-type transistors 78 and 80 having the emitters thereof connected to each other and to one end of a parallel combination of a resistor 82 and a capacitor 84, the opposite end of which parallel combination is connected to the line 44 leading from the pulse generator 42, as shown in FIG. 2.

The bases of transistors 78 and 80 are connected to input conductors 86 and 88 which lead from the output of the preceding binary storage element or flip-flop, in particular, flip-flop 50*d*. With respect to flip-flop 50*a*, the input conductors thereof lead, as shown in FIG. 2, from the exclusive OR gate 56.

Respective collectors of the PNP-type transistors 78 and 80 are connected to respective bases of a pair of PNP-type transistors 90 and 92. The base of transistor 90 is also connected through a resistor 94 to a B— source of supply voltage 96, and the base of transistor 92 is connected through a resistor 98 to the B— source 96. The collector of transistor 90 is connected to a resistor 102 leading to ground, to the anode of a diode 104 the cathode of which is connected to the base of NPN transistor 92 and the collector of PNP transistor 80, and to a first output line 52. The collector of transistor 92 is connected to a resistor 108 leading to ground, to the anode of a diode 110 the cathode of which is connected to the base of an NPN transistor 90 and the collector of PNP transistor 78, and to a second output line 54. At the common connection of resistors 94, 98, and 100, at the B— voltage source 96, there is also connected a capacitor 114 leading to ground.

The output lines 52 and 54 lead to the exclusive OR gate 56, as shown in FIG. 2. With respect to flip-flops 50*a* through 50*d*, the output lines of each would lead to the respective succeeding input lines of the next flip-flops such as input lines 86 and 88 of flip-flop 50*e* in FIG. 3.

Figure 4:
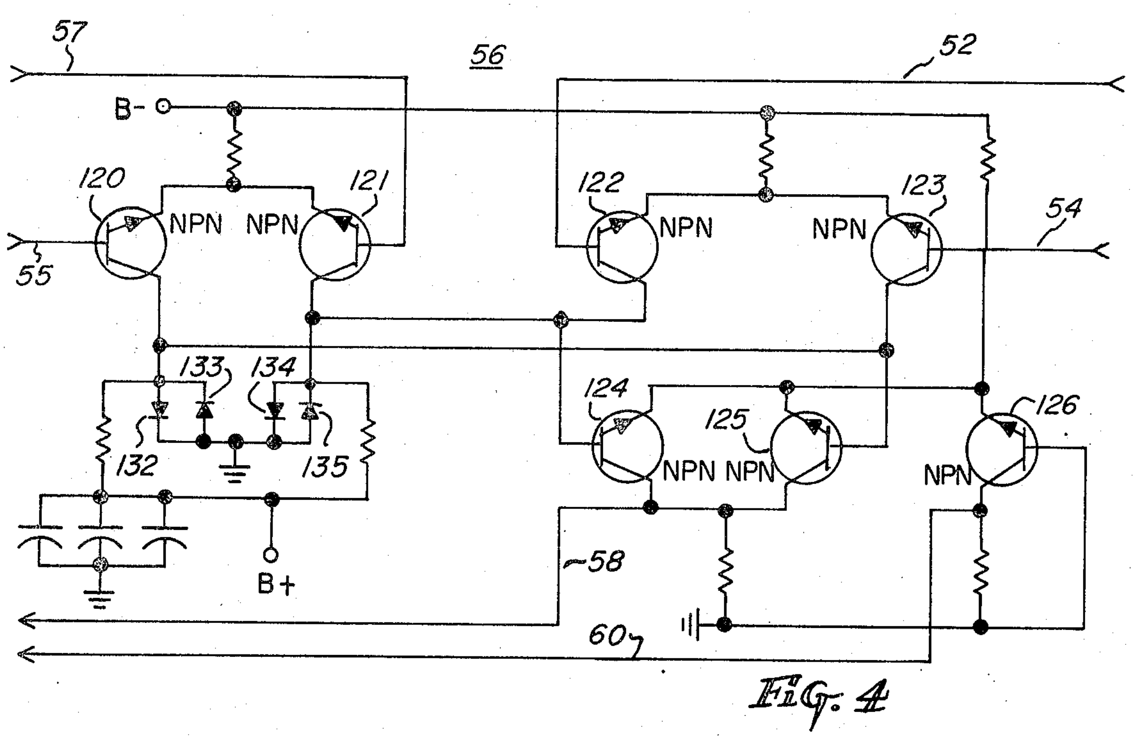
FIG. 4 is a schematic circuit diagram of the exclusive OR circuit of the pattern generator shown in FIG. 2.

An exclusive OR gate found particularly suitable in the present invention is shown in FIG. 4. The gate includes seven NPN-type transistors 120 to 126. A first pair of transistors 120 and 121 are connected to respective output lines 55 and 57 from flip-flops 50*b* in order to receive, upon a pulse being generated on line 44 from pulse generator 42, the previous stored bit from flip-flop 50*b*. A second pair of transistors 122 and 123, are connected to the output lines 52 and 54, respectively, of flip-flop 50*e* in order to receive, upon a pulse being generated on line 44 from pulse generator 42, the previous stored bit of flip-flop 50*e*.

When the inputs to the bases of transistors 120 and 123 are negative relative to the respective emitters, the collectors thereof are clamped at a positive voltage due to diode 132. Likewise, the collectors of transistors 121 and 122 are at the same positive voltage due to diode 134, when the inputs to the bases of transistors 121 and 122 are negative relative to their respective emitters. If the inputs to the bases of the transistors 120 and 123, or 121 and 122, are positive with respect to their emitters, these transistors turn on and the collectors become clamped to a negative voltage due to diodes 133 and 135. The bases of transistors 124 and 125 may therefore be biased at either a plus or minus voltage. Transistors 124, 125, and 126 form a three-transistor differential amplifier. If the input to the base of either transistor 124 or 125 is at the positive clamped voltage, the voltage level at the common collectors of transistors 124 and 125 is negative, and the voltage level at the collector of transistor 126 is zero. If the input to the bases of both transistors 124 and 125 are at the negative clamped voltage, the voltage level at the common collectors of transistors 124 and 125 is zero, and the voltage level at the collector of transistor 126 is negative.

The collectors of transistors 124 and 125 are connected to the output line 60 and the collector of transistor 126 is connected to output line 58, both output lines of which lead to respective input lines of the binary storage element or flip-flop 50*a* as shown in FIG. 2.

The automatic starter 62 is shown in FIG. 5 and includes diodes 140 and 142, and capacitor 144 connected to form a rectifier with a saturating amplifier, transistor 146, which is driven by the pattern output. When a pattern is conducted from amplifier 74 on line 77 to the automatic starter 62, the resulting direct current to the base of transistor 146 saturates the same, resulting in a near zero output voltage on line 64 leading through switch 66 in FIG. 2 placed in position A, as shown, and through line 68 to line 52 between flip-flop 50*e* and exclusive OR gate 56. The B— source 96 may be disconnected to stop pattern generation. Upon reconnection, the flip-flops 50 are all in a "zero" binary state, causing the base potential of transistor 146 to drop, and the voltage at the collector to rise, thus setting flip-flop 50*e* to the binary "one" state. The pattern then begins and is continuously maintained.

The following table illustrates the pattern generator sequence and successive states of the storage elements or flip-flops 50*a* through 50*e* of pattern generators 16 and 32:

STATES OF THE STORAGE ELEMENTS FOR THE FULL SEQUENCE

| No. | 50a | 50b | 50c | 50d | 50e | |
|---|---|---|---|---|---|---|
| 1 | 1 | 1 | 1 | 1 | 1 | |
| 2 | 0 | 1 | 1 | 1 | 1 | |
| 3 | 0 | 0 | 1 | 1 | 1 | |
| 4 | 1 | 0 | 0 | 1 | 1 | |
| 5 | 1 | 1 | 0 | 0 | 1 | |
| 6 | 0 | 1 | 1 | 0 | 0 | |
| 7 | 1 | 0 | 1 | 1 | 0 | |
| 8 | 0 | 1 | 0 | 1 | 1 | |
| 9 | 0 | 0 | 1 | 0 | 1 | |
| 10 | 1 | 0 | 0 | 1 | 0 | |
| 11 | 0 | 1 | 0 | 0 | 1 | |
| 12 | 0 | 0 | 1 | 0 | 0 | |
| 13 | 0 | 0 | 0 | 1 | 0 | |
| 14 | 0 | 0 | 0 | 0 | 1 | |
| 15 | 1 | 0 | 0 | 0 | 0 | |
| 16 | 0 | 1 | 0 | 0 | 0 | |
| 17 | 1 | 0 | 1 | 0 | 0 | |
| 18 | 0 | 1 | 0 | 1 | 0 | |
| 19 | 1 | 0 | 1 | 0 | 1 | |
| 20 | 1 | 1 | 0 | 1 | 0 | |
| 21 | 1 | 1 | 1 | 0 | 1 | |
| 22 | 0 | 1 | 1 | 1 | 0 | |
| 23 | 1 | 0 | 1 | 1 | 1 | |
| 24 | 1 | 1 | 0 | 1 | 1 | |
| 25 | 0 | 1 | 1 | 0 | 1 | |
| 26 | 0 | 0 | 1 | 1 | 0 | |
| 27 | 0 | 0 | 0 | 1 | 1 | |
| 28 | 1 | 0 | 0 | 0 | 1 | |
| 29 | 1 | 1 | 0 | 0 | 0 | |
| 30 | 1 | 1 | 1 | 0 | 0 | |
| 31 | 1 | 1 | 1 | 1 | 0 | |
| 32 | 1 | 1 | 1 | 1 | 1 | Pattern repeats. |

Since there are five storage elements, there are $2^5-1$ or thirty-one possible word states. Each successive word state occurs during a pulse interval and the transfer of each bit of one storage element to the next succeeding storage element occurs at the pulse rate from generator 42, which rate corresponds to the clock frequency. Each storage element 50 receives thirty-one bits of information before the pattern repeats itself. More specifically, at the beginning of any interval between pulses, the bit in storage element **50*a* is shifted to storage element 50*b* which bit during the next or second interval is shifted into storage element 50*c* and exclusive OR gate 56. Simultaneously, at the beginning of the second interval, another bit from storage element 50*a* is shifted into storage element 50*b*. Similarly, at the beginning of the third interval the binary information which was in the storage element 50*a* during the second interval is shifted to storage element 50*b*; the binary information in the storage element 50*b* is shifted into the binary storage element 50*c* and into exclusive OR gate 56; and the binary information in storage element 50*c* is shifted into the binary storage element 50*d*** and so on as the process continues.

Figure 6:
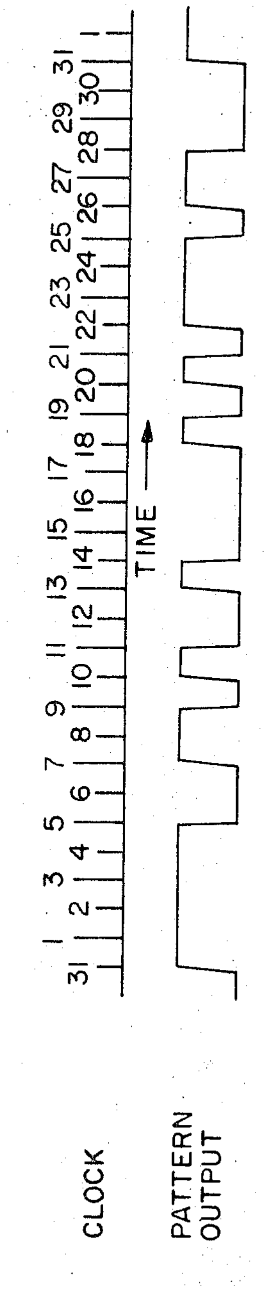
FIG. 6 is a typical waveform diagram illustrating a bit pattern sequence which may be repeatedly produced by the pattern generators shown in FIG. 2.

The digital information shifted into the storage element **50*a* is determined by the output of the exclusive OR gate 56, the logic of which, as already noted, is dependent upon the states of simultaneously occurring bits of the binary storage elements 50*b* and 50*e*. The logic in each succeeding bit in the pattern occurs at the output of each of the storage elements 50 although there is a timewise spacing; that is, the binary information at the output of storage element 50*a* during one clock period occurs at the output of storage element 50*b* during the next or second clock period and at the output of 50*c* during the third clock period, and so forth. This pattern derived from pattern generators 16 and 32 is shown in the vertical columns illustrating the outputs of storage element 50*d* and 50*c*, respectively. As readily seen, the output binary pattern derived, for example, from storage element 50*d* is 1111001101001000010101110110001; and the pattern then repeats itself. This output pattern waveform is illustrated in FIG. 6, which waveform is shown beginning at the thirty-first bit in the pattern sequence which is a binary one. Since bits one through four are also binary ones, there are five successive binary ones then followed by a pair of binary zeros, and so forth as the pattern continues as described. It should be apparent that other patterns could be readily generated, for example, by the inclusion of additional storage elements, exclusion of one or more of the storage elements shown, and by connecting the inputs to the exclusive OR gate 56 so as to receive the outputs of other storage elements 50**.

Figure 7:
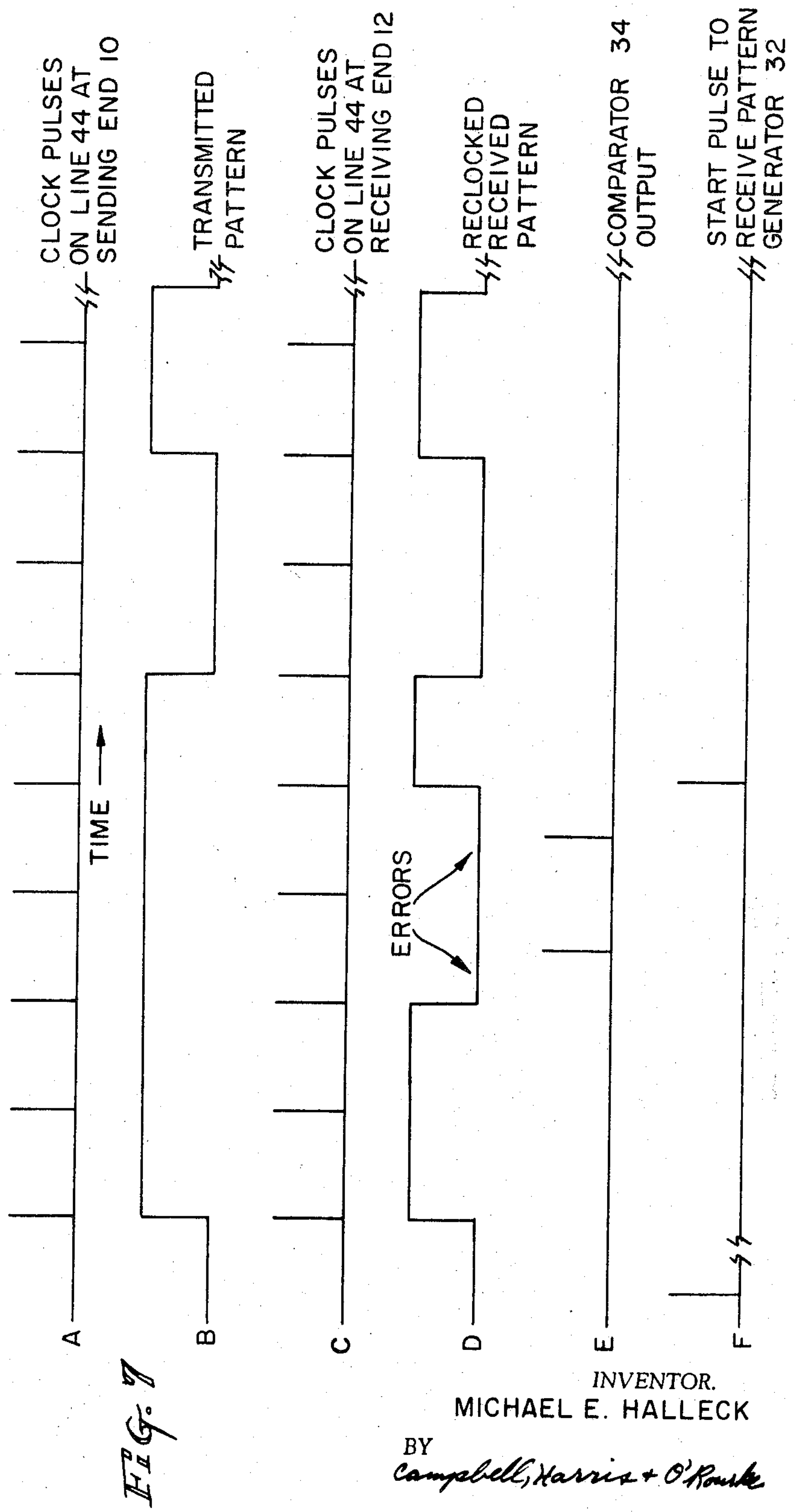
FIG. 7 is a signal timing diagram to aid in the operational description of the invention.

Referring now to the timing diagram of FIG. 7, there is shown in FIG. 7A the pulses occurring at the clock frequency on line 44 in response to the clock signal at input 18 in respect to pattern generator 16 at the sending station 10; and in FIG. 7C the pulses generated on line 44 in response to the clock signal on line 38 from the clock synchronizer 28 in respect to pattern generator 32 at the receiving station 12. FIG. 7B is a diagrammatic representation of eight bits of the pattern sent from the transmitting station 10, in accordance with the sequence as shown in the sequence table of FIG. 5. The transmitted pattern as shown in FIG. 7B also illustrates the pattern produced by pattern generator 32 at the receiving station 12.

FIG. 7D is a diagrammatic representation of the received pattern as reclocked in the manner as hereinafter described, and which pattern is conducted through a line 148 from reclocker 26 to the comparator 34. The comparator 34 compares each bit of the processed received pattern on line 148 with the compare pattern on line 76 from pattern generator 32.

As shown in comparing the waveforms of FIG. 7B and 7D, there are two errors which are illustrated by the diagram of FIG. 7E representing the output of comparator 34. The short duration pulses indicative of the number of errors, may be applied to the error counter 35 and counted in conventional manner well known in the art. FIG. 7F is a diagrammatic illustration of the input start pulse conducted on line 70 to the pattern generator 32 from the word recognizer 30 to start the pattern in order that corresponding portions thereof, which are supposed to be identical bits in a perfect system, are compared at the same time, i.e., in proper sequence. The pulse to the left of the broken-away portion in FIG. 7F illustrates the initial pulse conducted to pattern generator 32 to start the pattern. The word recognizer 30 described in FIG. 10, produces a pulse after four successive binary "ones" in the pattern as illustrated to the right of the broken-away portion, although once the pattern is started in response to the pulse and synchronized, the pattern generator 32 continues to regenerate the pattern and further pulses from word recognizer 30 are not necessary.

Referring back to FIG. 1, the received pattern is also conducted to the clock synchronizer 28 when switch 22 is in the position A. The function of clock synchronizer 28 is to produce a clock signal which is accurately timed in phase and frequency with clocking information in the transmitted signal; namely, in the received pattern.

Figure 8:
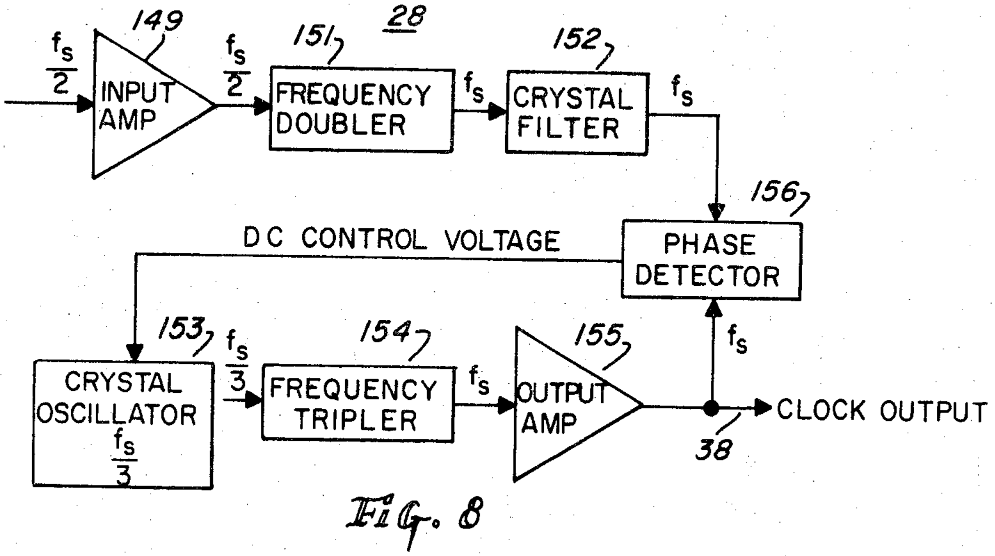
FIG. 8 is a block diagram illustrating the clock synchronizer of FIG. 1 for producing a clock timing signal of related phase and frequency to the received digital signal.

An embodiment of the clock synchronizer 28 is shown in FIG. 8 wherein the input from receiver 20 is the digital nonreturn-to-zero signal. Since the predominant frequency component of a continuous nonreturn-to-zero signal is one-half of the bit rate or $f_{s/2}$ where $f_s$ is the system clock frequency, the output of an amplifier 149 is conducted to a frequency doubler 151. The signal at frequency $f_s$ from the frequency doubler 151 is filtered by a crystal filter 152 to remove the unwanted frequency components. A crystal oscillator 153, which may be a fundamental cut crystal, operates at a frequency of $f_{s/3}$. By using a fundamental cut crystal, the frequency may be varied over a wider range than would be possible with an overtone cut. The frequency from the oscillator $f_{s/3}$ is multiplied up to $f_s$ by a frequency tripler 154 which increases the frequency deviation by a factor of three. An amplifier 155 feeds the signal to the output line 38. The output signal and the signal from filter 152 are conducted to a pair of inputs of a conventional phase detector 156 which generates a direct current voltage proportional to the phase difference between the inputs to the detector 156. The control voltage is fed back to oscillator 153 in order to control the frequency, thus locking the phase of the output signal on line 38 to that from the filter 152. A more elaborate embodiment of the digital clock synchronizer is substantially as shown and described in U.S. Patent No. 3,308,387 by Kenneth R. Hackett issued Mar. 7, 1967.

The received pattern signal is also conducted on a line 157 to the reclocker 26 provided to improve the quality of, and retime, the received pattern signal. In the reclocker illustrated in the block diagram of FIG. 9, the input is connected to an amplifier 158, which inverts the signal to the opposite binary state, the amplifier output of which is connected to a threshold detector 160 of conventional type, the threshold detector being a decision element operative to determine whether a binary "1" or "0" signal is detected and to produce an appropriate NRZ signal output which is conducted to an AND gate 162. The clock signal from the clock synchronizer is conducted to an input amplifier 164 of the reclocker. A variable delay line 166 is effective to delay the amplified clock signal by an amount less than the time interval of one bit so that a pulse generator 168, responsive to the delayed clock signal, generates fast rise time pulses which are conducted to another input of the AND gate 162 at the same time that the NRZ signal from the threshold detector 160 reaches its maximum and minimum excursions which represent the binary "1" and "0" states, respectively. The output from AND gate 162 drives an amplifier 169 which reinverts the signal to the binary state of the original signal conducted to input amplifier 158 and also permits the reclocked pattern to be terminated into and matched with a low impedance network such as comparator 34. A reclocker suitable for use in the invention is also shown and described in U.S. Patent No. 3,270,288, entitled "System for Reshaping and Retiming a Digital Signal," by Kenneth R. Hackett, issued Aug. 30, 1966.

As shown in FIG. 1, the reclocked received pattern on line 148 is conducted to one input of the word recognizer 30 which is responsive to four successive binary "ones" received in the 31 bit pattern to supply a start pulse which is conducted on line 70, through switch 66 in position B thereof and to the pattern generator 32.

A block diagram of the word recognizer 30 is shown in FIG. 10 and includes four binary storage elements or flip-flops 170*a* to 170*d*, circuitry and connections of each, and to one next succeeding of which may be substantially the same as the circuitry and connections of each, and to a respective one next succeeding as shown and described with reference to the binary storage elements or flip-flops 50. The flip-flops 170 also form a shift register operative at the clock signal frequency.

The reclocked received pattern from reclocker 26 is conducted between an input line 172 and ground to flip-flop 170*a*. The clock signal from clock synchronizer 28 is conducted from line 38 and is delayed and amplified in a variable delay amplifier 174, the output of which is connected to a pulse generator 176. The delay of the variable delay amplifier 174 may be adjusted for a delay less than one clock period so that the pulses produced at the same frequency as the clock signal on line 38, and which drive flip-flops 170 are in phase with the received pattern on line 172. The output of the pulse generator 176 is connected by a line 178 leading to inputs of each flip-flop 170. As the binary signal state stored in each flip-flop 170 shifts at the clock rate, the output signal representative of the newly stored state on lines 180*a* to 180*d* is immediately conducted to the four separate inputs of an AND gate 182. The AND gate 182 is responsive to the simultaneous presence of binary "ones" at the four inputs thereof to produce a pulse on a line 184 which is connected to a start-switch 186, shown in open position. A start signal on line 184, upon depression of start button 186, is conducted to line 70 leading to pattern generator 32.

Assuming that the microwave communications link does not contribute any errors to the digital pattern, the word recognizer 30, as the received pattern repeats itself, can first receive four successive binary "ones" after the third bit, as shown under the vertical column illustrating the output of flip-flop 50*d* in FIG. 6 since the thirty-first bit is also a binary "one" signal.

The timing diagrams of FIGS. 11B through 11E illustrate the binary states of each of the flip-flops 170 during a substantial interval portion of a pattern period. The pulses represented in FIG. 11A are conducted on line 178 from generator 176 to the flip-flops 170 in phase with, and at the same frequency as the phase, and frequency of the reclocked digital input pattern on line 172. At the beginning of the fifth full period, there exists a simultaneous binary "one" output from each of the flip-flops 170, which signals are conducted to AND gate 182 causing an output pulse to be generated during the period on output line 184, as illustrated in FIG. 11F. The pulse is conducted, upon switch 186 being closed, to line 170 leading to the pattern generator.

At the time, just before the start pulse, the thirty-one bit pattern generator 32 having no automatic starter, such as automatic starter 62 used with pattern generator 16, is in an all "zero" state. The start pulse will cause the pattern generator 32 to change from an all "zero" state to an all "one" state which represents five successive binary "one" bits in the thirty-one bit pseudorandom pattern. The remainder of the thirty-one bit pattern from pattern generator 32 will then follow, the comparison being first effected after the fourth successive binary "one" in the pattern. The output from the pattern generator 32 after receiving the start pulse is 1001101001, etc.

In order to accomplish synchronization of the generated pattern, compensation for the delay time inherent in the response of the word recognizer 30 is provided by taking the output signal pattern from pattern generator 32 between one line and ground from the output of flip-flop 50*c* on line 75 of FIG. 2 with switch 73 in position B. This, in effect, advances the pattern from pattern generator 32 by a small incremental amount less than a single clock interval ahead of the received pattern. The variable delay clock amplifier 40, upon switch 36 being placed in position B, may be adjusted to appropriately delay the clock input signal to the pulse generator 42 in order that each bit of the generated pattern, and therefore the generated pattern itself, begins, ends, and is repeated and conducted to comparator 34 simultaneously as the corresponding bit of the received pattern, and the received pattern itself, begins, ends, and is repeated and conducted to the comparator 34.

Figure 12:
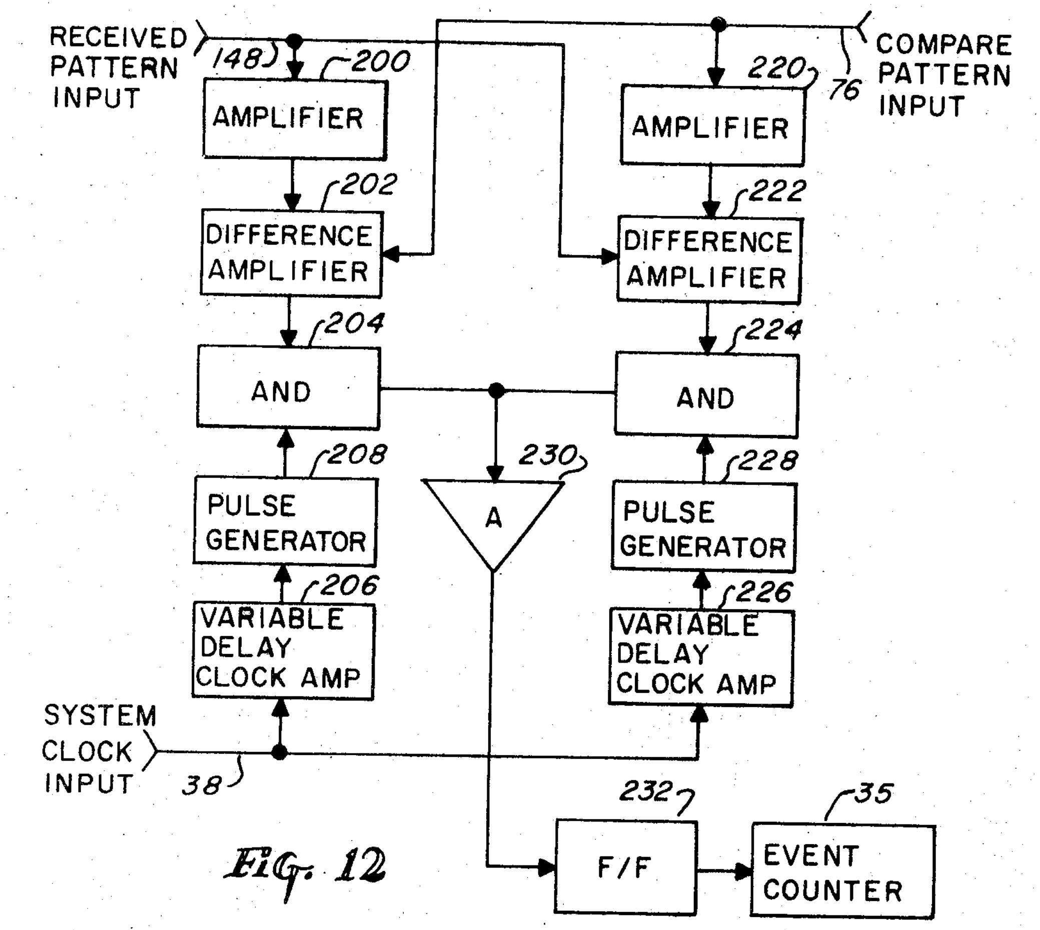
FIG. 12 is a block diagram illustrating the high speed comparator of FIG. 1.

Referring to FIG. 12, there is shown a block diagram of the comparator 34 which compares the received and reclocked pattern with the synchronized and separately generated compare pattern. The received and reclocked pattern on line 148 is conducted to an amplifier 200 which amplifies and centers the pattern at the same level as the compare pattern on line 76 from pattern generator 32. The patterns enter a difference amplifier 202 which produces a pulse output only when the compare pattern potential is greater by a predetermined amount than the reclocked received pattern potential. The output conducted to one input of an AND gate 204 represents the number of "zeros" in the received pattern that are erroneous. The system clock signal conducted on line 38 from clock synchronizer 28 is delayed and amplified in a variable delay clock amplifier 206. The delayed clock signal activates a pulse generator 208, the output pulses from which are conducted to a second input of the AND gate 204 and arrive at the second input at the same time as the output of the difference amplifier 202 arrives at the first input thereof.

The receiver generated compare pattern on line 76 is also conducted to an amplifier 220 which amplifies and centers the pattern at the same level as the reclocked receive pattern on line 148. The patterns enter a difference amplifier 222 which produces a pulse output only when the compare pattern potential is less by a predetermined amount than the reclocked received pattern potential. The output conducted to one input of AND gate 224 represents the number of "ones" in the received pattern that are erroneous. The system clock signal from line 38 is delayed and amplified in a variable delay clock amplifier 226. The delayed clock signal activates a pulse generator 228, the output pulses from which are conducted to a second input of the AND gate 224 and arrive at the second input at the same time as the output of the difference amplifier arrives at the first input thereof. The reclocking procedure, utilizing the AND gates 204 and 224, respectively, eliminates the possibility of counting noise spikes that may be received with the received pattern input as errors.

The number of erroneous "zeros" and "ones" enter amplifier 230, the output from which represents the total number of errors in the reclocked received pattern. Depending upon the digital bit frequency, the error rate may be too high for conventional counters. It may therefore be desirable to count down or divide the number of errors. The output from amplifier 230 is therefore conducted to one such divider, a bistable flip-flop 232, the output from which is a series of pulses of one-half the frequency of the input thereof, and which output may be connected to the event counter 35 of conventional type.

Figure 13:
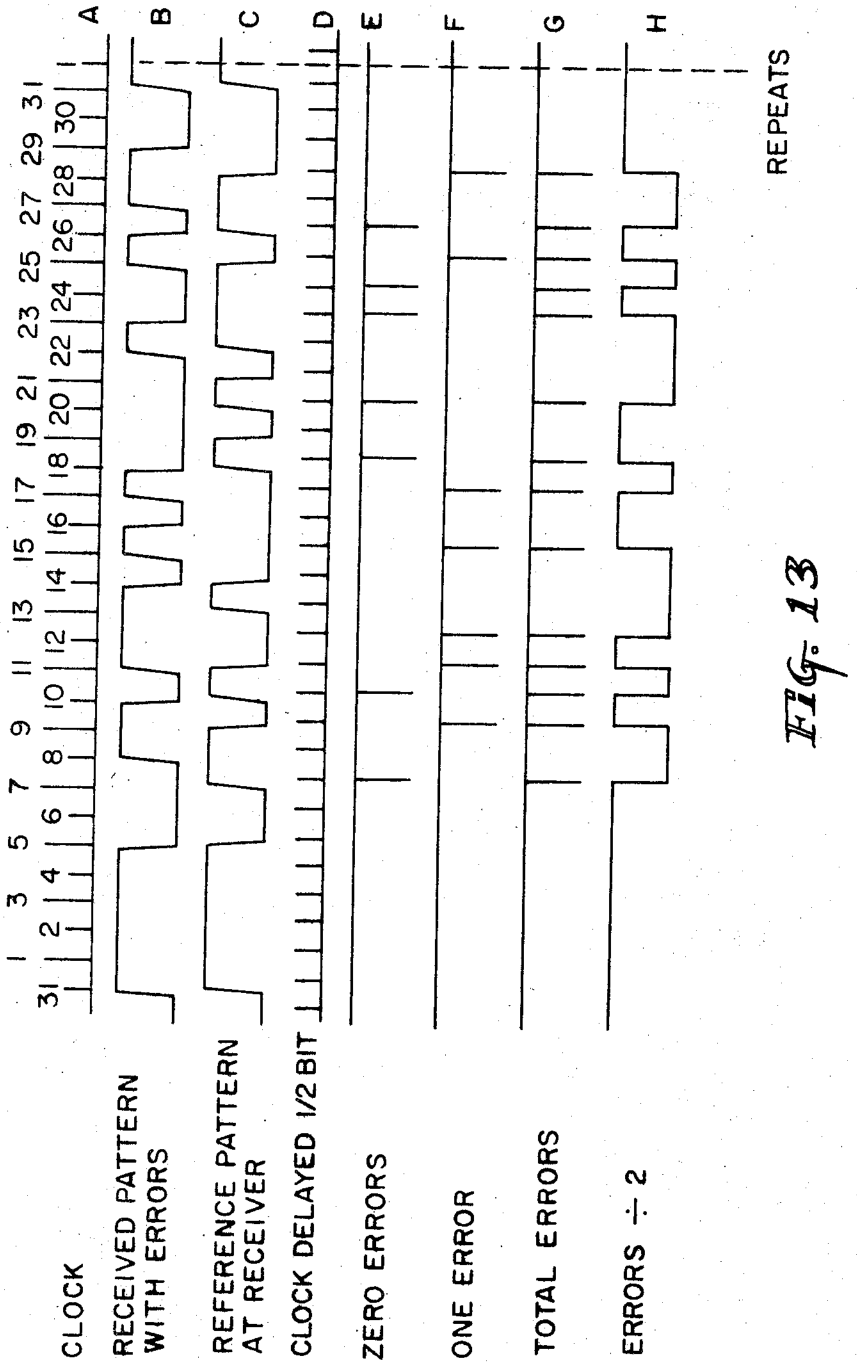
FIG. 13 is a timing diagram illustrating the operation of the comparator of FIGS. 1 and 12.

The timing relationship of the signals at different points in the circuit of FIG. 12 may be better understood with reference to FIG. 13. FIG. 13A represents the clock pulses that would be generated by pulse generators 208 and 228 if the delay amplifiers 206 and 226, respectively, were removed and the clock input on line 38 connected directly to pulse generators 208 and 228. FIG. 13B represents a completely reclocked received pattern with errors and FIG. 13C represents the standard compare pattern generated simultaneously by pattern generator 32. FIG. 13D represents the delayed clock signals from pulse generators 208 and 228. FIGS. 13E and 13F show the signal outputs from AND gates 204 and 224, representing the "zero" and "one" errors, respectively, in the received pattern. The output from amplifier 230 representing the total number of errors is illustrated in FIG. 13G. The total number of errors is divided or counted down by a factor of two in the flip-flop 232, the output signal of which is illustrated in FIG. 13H and which signal may be conducted to the error event counter 35.

It should be apparent that if the patterns are not synchronized, the event counter 35 would indicate an unusually large amount of errors. Further, it may be desirable to generate a pattern at the receiving station 12, which pattern differs from the received pattern at predetermined bits. In this manner, the number of bit discrepancies during a given interval may be readily calculated and a count greater than the predetermined amount in which the binary states of bits differ, due only to patterns of a different bit sequence, would indicate the digital signal discrepancies due to system deficiencies.

In some data transmission systems, it is possible to transmit and receive data in communication modes of higher order than the binary mode; for instance, the ternary and quaternary modes in which information is passed by the presence and absence, or plus and minus variations of three and four dicrete levels, respectively, of one parameter of a signal.

A binary signal, converted into a signal of a higher order mode before transmission, may be received, reconverted, synchronized and then compared with a reference binary digital pattern from a suitable pattern generating source.

Figure 9:
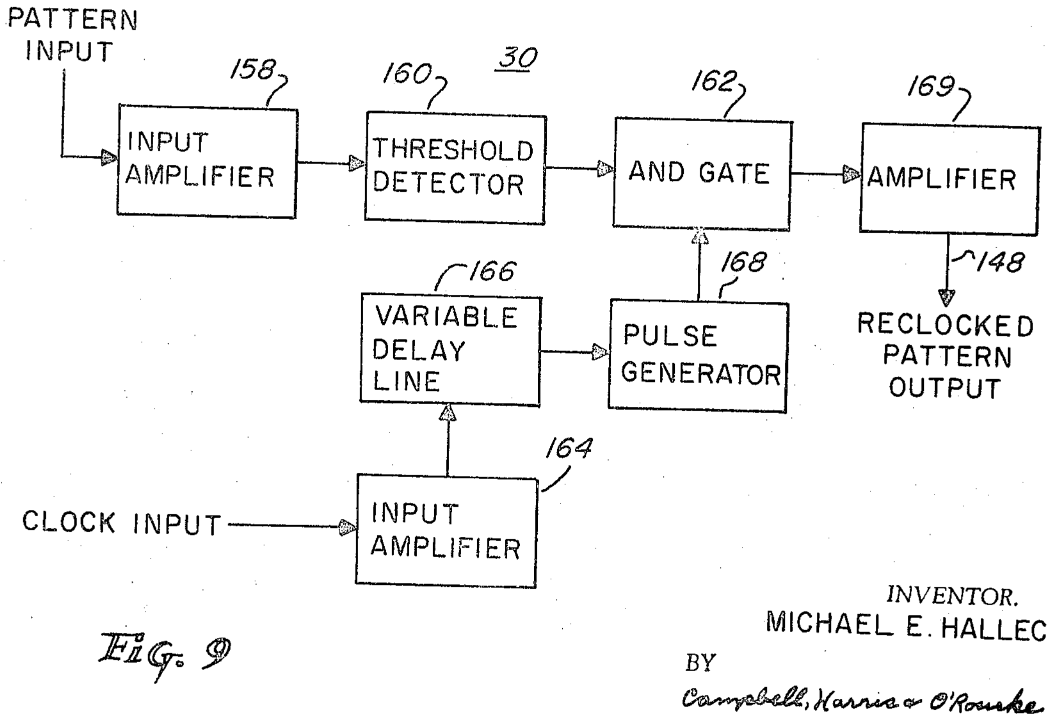
FIG. 9 is a block diagram illustrating the reclocker of FIG. 1 for reshaping and retiming a digital signal.
Figure 14:
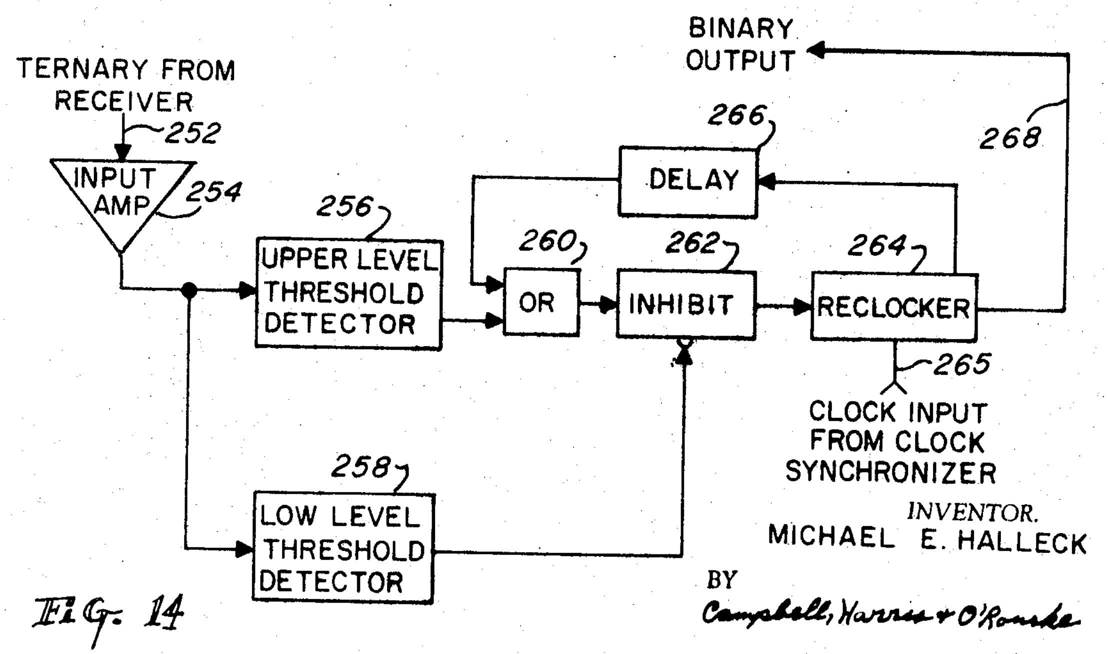
FIG. 14 is a block diagram illustrating a signal converter utilized to change a received ternary mode or three-level digital signal into a binary mode or two-level digital signal.

FIG. 14 illustrates, as an example, a ternary-to-binary converter 250 which may be included in the detection apparatus at receiving end 12. An input 252 leads exclusively from a receiver, such as receiver 20 of FIG. 1, to an input inverting amplifier 254 which inverts the highest portion of the three-level signal to the lowest portion level, and vice versa. The NRZ signal is conducted to conventional upper and lower threshold detectors 256 and 258, respectively. Upon the upper threshold being exceeded, a binary "one" signal is generated and conducted to an OR gate 260. The binary "one" signal passes through an INHIBIT gate 262 and into the reclocker 264, of a type such as reclocker 26 of FIGS. 1 and 9. A clock signal, derived from a source such as clock synchronizer 28 of FIGS. 1 and 8, is applied at an input 265. An inverted reclocker output, which may be derived, for instance, at the output of AND gate 162 of the reclocker 26 of FIG. 9, is fed back through a delay line 266 to another input of OR gate 260, and the reclocked noninverted output at a line 268 may be derived, for instance, at output line 148 of FIG. 9.

If a binary "one" is conducted on input 252 to the amplifier 254, a binary "zero" is generated which activates the lower threshold detector 258 to produce a pulse conducted to the control input of the INHIBIT gate 262. The INHIBIT gate 262 prevents any information from passing when it is excited by the lower threshold detector 258, thus ensuring that a binary "zero" is conducted to the reclocker 264. A binary "one" is therefore regenerated at the output 268 of reclocker 264. It is readily apparent that activation of the upper threshold detectors 256 is mutually exclusive with activation of the lower threshold detector 258.

If neither threshold is exceeded, the signal at input 252, is interpreted as having changed state. More specifically, if the inverted output is a "zero," it is fed back through delay line 266 to the OR gate 260. The new inverted output is therefore a binary "one" at the next clock interval. If neither threshold of the detectors 256 and 258 are exceeded at the subsequent clock period, the binary "one" state at the inverting output is fed back to the input of the reclocker 264. Because of the inversion, the inverting output is changed to the "zero" state at the next clock period. The delay line 266 delays the signal from the reclocker 264 by an interval less than a clock period so as to ensure that successive output signals for the upper and lower threshold detectors 256 and 258 represent the bit information of the successive bit immediately following the bits representing the signal being delayed. In this manner, the threshold detectors 256 and 258 have time to respond to the uppermost and lowermost signals before the feedback signal is passed through the OR gate 260.

The reclocked noninverted output of the reclocker is a binary representation of the received ternary signal. The reclocked digital signal may be conducted to a word recognizer, such as the word recognizer 30 of FIGS. 1 and 10, to provide a starting signal to a reference pattern generator such as pattern generator 32 of FIGS. 1 and 2, and also may be conducted to a comparator, such as comparator 34 so that the digital signals may be compared and the bit discrepancies counted as already described.

From the above description, it will be apparent that other various methods in the apparatus and the method of use of the invention, in use with the digital communications system, may be made. Therefore, the invention is not intended to be limited to the specific details of the apparatus described herein.

What I claim is:

1. Apparatus for detecting variations in transmitted digital signals, said apparatus comprising:

means for receiving a digital signal at least a portion of which has a predetermined transmitted pattern;

signal generating means for producing a reference digital signal having a pattern related at least in part to said predetermined transmitted pattern;

signal control means for substantially synchronizing the part of the reference digital signal related to said predetermined transmitted pattern with the predetermined transmitted pattern in the received digital signal, said signal control means including means for starting the signal generating means responsive to a predetermined bit sequence in the received digital signal; and means for comparing said received digital signal with said synchronized digital signal from said signal generating means, said comparison means producing an output signal indicative of the variations in the compared signals.

2. Apparatus for detecting variations in transmitted digital signals, said apparatus comprising:

means for receiving a digital signal at least a portion of which has a predetermined transmitted pattern;

signal generating means for producing a reference digital signal having a pattern related at least in part to said predetermined transmitted pattern;

signal control means for substantially synchronizing the part of the reference digital signal related to said predetermined transmitted pattern with the predetermined transmitted pattern in the received digital signal; and means for comparing said received digital signal with said synchronized digital signal from said signal generating means, said comparison means including first difference amplifier means responsive to the received digital signal and the pattern generated by the signal generating means for producing an output signal when the reference pattern signal is at one digital state simultaneously as the received digital signal is at another digital state, and second difference amplifier means responsive to the received digital signal and the pattern generated by the signal generating means for producing an output signal when the reference pattern signal is at the other digital state simultaneously as the received digital signal is at the one digital state, whereby the output signals of said first difference amplifier means correspond to digital signal errors of the other state in the received signal which errors may be counted and the output signals of said second difference amplifier means correspond to digital signal errors of the one state which errors may be counted.

3. Apparatus for detecting variations in transmitted digital signals, said apparatus comprising:

means for receiving a digital signal at least a portion of which has a predetermined transmitted pattern;

signal generating means for producing a reference digital signal having a pattern related at least in part to said predetermined transmitted pattern, said signal generating means including a plurality of storage elements serially connected to form a shift register, each of said storage elements adapted to receive a timing signal to shift a signal stored therein simultaneously as a new signal is stored, and one of said storage elements being connected to receive a control signal for activating said storage elements, and gating means having inputs connected to at least two of said storage elements for producing a predetermined output digital signal depending upon the simultaneous input digital signal states, whereby the gating means digital signals may control successive stored digital states of one of said storage elements other than a storage element having an input connected to the gating means, the successive digital states being shifted into the serially connected storage elements for intervals determined substantially by the timing signals;

signal control means for substantially synchronizing the part of the reference digital signal related to said predetermined transmitted pattern with the predetermined transmitted pattern in the received digital signal; and means for comparing said received digital signal with said synchronized digital signal from said signal generating means, said comparison means including:

first difference amplifier means responsive to the received digital signal and the reference pattern generated by the signal generating means for producing an output signal when the reference pattern signal is at one digital state simultaneously as the received digital signal is at another digital state, second difference amplifier means responsive to the received digital signal and the pattern generated by the signal generating means for producing an output signal when the reference pattern signal is at the other digital state simultaneously as the received digital signal is at said one digital state, and whereby the output signals of said first difference amplifier means correspond to digital signal errors of the other state in the received signal which errors may be counted and the output signals of said second difference amplifier means correspond to digital signal errors of the one state which errors may be counted.

4. A detector for use in a digital communication system for determining, by signal comparison, the quantitative digital bit discrepancies between a binary digital signal transmitted as a ternary digital signal, and a reference binary signal, the detector comprising:

means for receiving the ternary digital signal;

means for converting the ternary digital signal into a binary signal representative of the ternary signal;

means for producing a timing signal having a predetermined phase and frequency relation with respect to the ternary signal as converted into the binary signal;

digital signal recognition means responsive to the timing signal at a predetermined bit sequence in the converted digital signal received to produce a control signal;

pattern generating means responsive to the timing signals and the control signal to produce a reference binary digital signal pattern having a bit frequency and phase corresponding to the bit frequency and phase, respectively, of the converted digital signal; and means for comparing the converted digital signal received and the digital signal pattern produced by the pattern generating means to produce signals corresponding to the quantitative variations of the signals compared.

5. The detector defined in claim 4 wherein the converting means includes:

a first threshold detector to produce a signal at the upper level of the ternary signal;

a second threshold detector to produce a signal at the lower level of the ternary signal;

gating means having a control input connected to receive the signal from one of said detectors, a second input connected to receive the signal from the other of said detectors, and a third input, said gating means being effective to pass the signal at the third input upon the absence of a signal from the detectors;

means for inverting the gated signals; and means for feeding back the inverted signals to said third input of the gating means;

whereby a binary output signal of constantly changing state may be obtained from said gating means upon the absence of a signal from said detectors, and a binary signal of one state and another state may be obtained upon a signal being produced by the first and second threshold detectors, respectively.

6. Apparatus for detecting variations of signals as transmitted and received in a digital communication system, the apparatus comprising:

means for receiving a transmitted digital signal;

means for producing a timing signal having a predetermined phase and frequency relation with respect to the transmitted digital signal;

a digital signal pattern generator to produce a reference digital signal pattern;

a plurality of storage elements connected in cascade to form a shift register, each of said storage elements being responsive to the timing signal to shift a digital signal stored to a successive cascaded storage element, one of said storage elements being connected to the receiving means;

gating means connected to the storage elements and responsive to a predetermined storage relation in the storage elements to produce a starting signal conducted to the pattern generator; and means for comparing the digital signal received and the digital signal produced by the pattern generator to produce signals corresponding to the variations of the signals compared.

7. The detecting apparatus as defined in claim 6 wherein the comparing means includes:

first difference amplifier means responsive to the received digital signal and the reference pattern generated by the pattern generator for producing an output signal when the reference pattern signal from the pattern generator is at one digital state simultaneously as the received digital signal is at another digital state;

second difference amplifier means responsive to the received digital signal and the reference pattern from the pattern generator for producing an output signal when the reference pattern signal is at the other digital state simultaneously as the received digital signal is at said one digital state; and means for reclocking the outputs of said first and second difference amplifier means to eliminate noise and interference signals tending to distort the output signals of said pair of difference amplifier means;

whereby the output signals of said first difference amplifier means correspond to digital signal variations of the other state in the received digital signal which variations may be counted and the output signals of said second difference amplifier means correspond to digital signal variations of the one state which variations may be counted.

8. The detecting apparatus as defined in claim 7 wherein the pattern generator to produce a reference digital signal pattern includes:

a plurality of storage elements serially connected to form a shift register, each of said storage elements being responsive to the timing signal to shift a signal stored therein simultaneously as a new signal is stored, and one of said storage elements being connected to receive the starting signal from said first mentioned gating means; and an exclusive OR gate having inputs connected to at least two of said storage elements for producing a predetermined signal of one digital state for different state inputs and of another digital state for the same state inputs; and means connecting the output of said exclusive OR gate to one of said storage elements other than a storage element having an input connected to the exclusive OR gate;

whereby the successive digital states of each storage element are shifted into the next succeeding storage element for intervals determined substantially by the timing signals.

9. Apparatus for detecting signal transmission errors in a digital communication system, the apparatus comprising:

a pattern generator for producing a digital signal pattern having a predetermined bit sequence;

means for transmitting the signal pattern produced by said pattern generator;

means for receiving the transmitted digital signal pattern;

means for producing timing signals of related frequency and in predetermined phase relation to the bit frequency and phase, respectively, of the received digital signal pattern;

digital signal recognition means responsive to a predetermined bit signal sequence in the received pattern to produce a control signal;

a reference pattern generator responsive to the timing signals and the control signal for producing a reference digital signal pattern having a bit frequency and phase, and pattern frequency and phase corresponding to the bit frequency and phase, and pattern frequency and phase, respectively, of the received pattern signal; and means for comparing the digital signal pattern received and the reference digital signal pattern produced by the pattern generator to produce an output signal corresponding to the digital state discrepancies of bits of the digital signals compared.

10. The apparatus defined in claim 9 wherein the digital signal recognition means includes:

a plurality of storage elements cascaded to form a shift register, each of said storage elements being responsive to the timing signals to shift a digital signal stored to a successive cascaded storage element, one of said storage elements being connected to the digital signal receiving means; and gating means connected to outputs of the storage elements to produce the control signal conducted to the pattern generator after a predetermined digital signal storage relation in said storage elements.

11. The appartus defined in claim 9 wherein the comparing means includes:

first difference amplifier means responsive to the received pattern and the reference digital signal pattern for producing an output signal when the reference pattern signal from the reference pattern generator is at one digital state simultaneously as the received pattern signal is at another digital state;

second difference amplifier means responsive to the received pattern and the reference digital signal pattern for producing an output signal when the reference pattern signal from the reference pattern generator is at the other digital state simultaneously as the received pattern signal is at the one state; and means for reclocking the output signals of said difference amplifier means so as to eliminate noise interference signals tending to distort the signals;

whereby the output signals of said first difference amplifier means correspond to digital signal transmission errors of the other state in the received pattern which errors may be counted and the output signals of said second difference amplifier means correspond to digital signal transmission errors of the one state which errors may be separately counted.

12. The apparatus defined in claim 9 wherein the first mentioned pattern generator includes:

input means for receiving other timing signals;

a plurality of storage elements serially connected to form a shift register, each of said storage elements being responsive to said other timing signals to shift a signal stored therein to a succeeding cascaded storage element;

means for gating output signals of at least two of said storage elements, the output of said gating means being connected to one of said storage elements other than a storage element having an input connected to said gating means; and automatic starting means connected to receive the output of one of said storage elements, said starting means producing a signal, after a series of successive states other than any series of successive states in the pattern to render another storage element of a state to start the pattern;

whereby an ouput digital signal pattern may be continuously generated at the output of any of said storage elements.

13. The apparatus as defined in claim 12 wherein the gating means includes:

an exclusive OR gate, having a pair of inputs, for producing a predetermined signal of one digital state for simultaneous different state input signals and a predetermined digital signal of another digital state for simultaneous input signals of the same state;

whereby the successive digital states of a storage element connected to the output of the exclusive OR gate may be controlled in accordance to the digital signal states conducted to the gate inputs.

14. The apparatus defined in claim 9 wherein the reference pattern generator includes:

input means for receiving the timing signal from the timing signal producing means;

a plurality of storage elements serially connected to form a shift register, each of said storage elements being responsive to the timing signals to shift a signal stored therein to a successive cascaded storage element; and means for gating output signals of at least two of said storage elements, the output of said gating means being connected to one of said storage elements other than a storage element having an input connected to said gating means;

whereby a repetitious digital pattern may be generated on outputs of said storage elements.

15. The apparatus as defined in claim 14 wherein the gating means includes:

an exclusive OR gate for producing a predetermined signal of one digital state for different state inputs and a predetermined digital signal of another digital state for the same state inputs;

whereby the successive digital states of a storage element connected to the output of said exclusive OR gate may be controlled in accordance to the digital signal states conducted to the gate inputs.

16. Apparatus for detecting signal transmission errors in a digital communication system, the apparatus comprising:

input means for receiving timing signals;

a first plurality of storage elements serially connected in cascade to form a shift register, each of said storage elements being responsive to the timing signals to shift a digital signal stored therein to a succeeding cascaded storage element;

a first exclusive OR gate responsive to the signals from at least two of said storage elements for producing a predetermined signal of one digital state for different state input signals and of another digital state for the same state input signals;

means connecting the output of said first exclusive OR gate to one of said storage elements other than a storage element having an input connected to said exclusive OR gate;

means for transmitting the digital signal from an output of one of said storage elements of the shift register;

means for receiving the transmitted digital signal;

means for producing another timing signal having a predetermined phase and frequency relation with respect to the received digital signal;

reclocking means to retime and improve the quality of the digital signal received in accordance with the timing signal;

signal recognition means responsive to the timing signal at a predetermined digital signal bit sequence in the received digital signal to produce a synchronizing signal;

a second plurality of storage elements serially connected in cascade to form a shift register, each of said storage elements being responsive to the other timing signal to shift a signal stored therein to a succeeding cascaded storage element, and one of said storage elements being connected to receive the synchronizing signal from said signal recognition means for activating said storage elements;

a second exclusive OR gate responsive to the signals from at least two of said storage elements from said second plurality of storage elements for producing a predetermined signal of one digital state for different state input signals and of another digital state for the same state input signals;

means connecting the output of said second exclusive OR gate to one of said storage elements of said second plurality of storage elements other than a storage element having an input connected to said second exclusive OR gate;

first difference amplifier means responsive to the received digital signal, and a reference digital signal from an output of one of said storage elements of said second plurality of storage elements for producing an output signal when the reference digital signal is at one digital state simultaneously as the received digital signal is at another digital state;

second difference amplifier means responsive to the received digital signal and the reference digital signal for producing an output signal when the reference digital signal is at the other digital state simultaneously as the received digital signal is at the one digital state; and means for reclocking the outputs of said first and second difference amplifier means to eliminate noise and interference signals tending to distort the output signals of the pair of difference amplifier means;

whereby the output signals of said first difference amplifier means correspond to digital signal discrepancies of the other state in the received signal which discrepancies may be counted and the output signals of said second difference amplifier means correspond to digital signal discrepancies of the one state which discrepancies may also be counted.

17. In a detector of a type for determining, by signal comparison, the number of digital bit discrepancies between a transmitted digital signal as received and processed by a receiver remotely located from the origin location of the transmitted signal and a predetermined digital pattern signal from a reference pattern generator controlled in bit phase and bit frequency by synchronizing means, the synchronizing means producing a timing signal of predetermined phase and frequency relation with the received digital signal, digital signal recognition means comprising a plurality of storage elements serially connected in cascade to form a shift register, each of said storage elements being responsive to the timing signal from said synchronizing means to shift a digital signal stored to a successive cascaded storage element, and one of said storage elements being connected to the signal receiver; and gating means connected to outputs of the storage elements to produce a signal to start the reference pattern generaor after a predetermined signal storage relation exists in said storage elements.

18. In a digital detector for determining the number of digital bit discrepancies between a transmitted digital signal, as received and processed by a receiver remotely located from the origin location of transmission, and a reference pattern from a pattern generator, and having means for synchronizing the bit phase and bit frequency of the reference pattern with the bit phase and bit frequency of the received digital signal, a comparator comprising first difference amplifier means responsive to the received and processed digital signal and the reference pattern for producing an output signal when the reference pattern signal is at one digital state simultaneously as the received digital signal is at another digital state; second difference amplifier means responsive to the received digital signal and the reference pattern for producing an output signal when the reference pattern signal is at the other digital state simultaneously as the received digital signal is at the one state; and means for reclocking the outputs of said first and second difference amplifier means to eliminate noise and interference signals tending to distort the output signals of the pair of difference amplifier means; whereby the output signals of said first difference amplifier means correspond to digital signal discrepancies of the other state in the received digital signal which may be counted and the output signals of said other difference amplifier correspond to digital signal discrepancies of the one state which may also be counted.

19. A digital pattern generator for producing a digital pattern at a predetermined frequency, the pattern having a predetermined bit frequency depending on a timing signal, the pattern generator comprising:

input means for receiving the timing signal;

a plurality of flip-flop storage elements serially connected in cascade to form a shift register, each of said storage elements being responsive to the timing signals to shift a signal stored therein to a succeeding storage element;

means for gating the signals from at least two of said storage elements to produce a digital signal of one state for digital signals of different states conducted simultaneously to inputs thereof and a digital signal of another state for digital signals of the same state conducted simultaneously to inputs thereof;

whereby the gating means output digital signals may control successive stored digital states of one of said storage elements other than a storage element having an input connected to the gating means and which successive digital states are shifted as signals into serially connected storage elements for intervals determined substantially by the timing signal; and automatic starting means connected to receive the output of one of said storage elements, said starting means producing a signal after a series of successive states other than any series of successive states in the pattern to render the storage relation of another storage element of a state to start the pattern.

20. A comparator for indicating discrepancies between a pair of digital binary signals; the comparator comprising:

input means for receiving timing signals;

first difference amplifier means for producing a signal when one of said digital signals is at one binary level and the other of said digital signals is at another binary level upon receipt of a timing signal;

second difference amplifier means for producing a signal when the one digital signal is at the other binary level and the other digital signal is at the one binary level upon receipt of a timing signal; and means for reclocking the binary signals from the difference amplifier means so as to eliminate noise interference and distortion on the signals;

whereby the output signals of said first difference amplifier means and of said second difference amplifier means correspond to digital signal discrepancies between the binary signals compared, and which discrepancies may be counted.

21. Apparatus for detecting variations in transmitted digital signals, said apparatus comprising:

receiving means adapted to receive a signal of the ternary mode at least a portion of which has a predetermined transmitted pattern;

signal generating means for producing a binary mode signal;

means for converting said ternary mode signal to a signal of the binary mode, the states of the successive digital bits of the converted signal being indicative of the states of successive digital bits of said ternary mode signal received, and said converting means including a first threshold detector to produce one signal at the upper level of the ternary signal, a second threshold detector to produce another signal at the lower level of the ternary signal, gating means having a control input connected to receive the signal from one of said detectors, a second input connected to receive the signal from the other of said detectors, and a third input, said gating means being effective to pass the signal at the third input upon the absence of one and the other signals from the detectors, means for inverting the gated signals, and means for feeding back the inverted signals to said third input of the gating means;

whereby a binary output signal of constantly changing state may be obtained from said gating means upon the absence of the one and other signals from said detectors, and a binary signal of one state and another state being obtained upon a signal being produced by the first and second detectors, respectively;

wherein the received signal converted into a binary signal may be compared with the digital binary signal from the generating means;

signal control means for substantially synchronizing the part of the reference digital signal related to said predetermined transmitted pattern with the predetermined transmitted pattern in the received digital signal; and means for comparing said received digital signal with said synchronized digital signal from said signal generating means, said comparison means producing an output signal indicative of the variations in the compared signals.

References Cited

UNITED STATES PATENTS

| | | | |
|---|---|---|---|
| 2,945,915 | 7/1960 | Strip | 178—69 |
| 3,274,611 | 9/1966 | Brown et al. | 340—347X |
| 3,305,636 | 2/1967 | Webb | 178—69.5X |
| 3,308,434 | 3/1967 | Glasson et al. | 178—69.5X |
| 3,384,873 | 5/1968 | Sharma | 340—146.1 |
| 3,466,601 | 9/1969 | Tong | 340—146.1 |

MALCOLM A. MORRISON, Primary Examiner

C. E. ATKINSON, Assistant Examiner

U.S. Cl. X.R.

178—69.5